US012612527B2

(12) United States Patent
Fishman et al.

(10) Patent No.: US 12,612,527 B2
(45) Date of Patent: Apr. 28, 2026

(54) EXPANDABLE MICROSPHERE, MARKABLE ARTICLE, MARKED ARTICLE, AND METHOD OF MAKING THE SAME

(71) Applicant: 3M INNOVATIVE PROPERTIES COMPANY, St. Paul, MN (US)

(72) Inventors: Joshua M. Fishman, Minneapolis, MN (US); Sean M. Sweetnam, Minneapolis, MN (US); Jeffrey P. Kalish, St. Paul, MN (US); Caitlin E. Meree, St. Paul, MN (US); Badri Veeraraghavan, Woodbury, MN (US); Matthew H. Frey, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 905 days.

(21) Appl. No.: 17/763,084

(22) PCT Filed: Nov. 9, 2020

(86) PCT No.: PCT/IB2020/060544
§ 371 (c)(1),
(2) Date: Mar. 23, 2022

(87) PCT Pub. No.: WO2021/094901
PCT Pub. Date: May 20, 2021

(65) Prior Publication Data
US 2022/0380617 A1 Dec. 1, 2022

Related U.S. Application Data

(60) Provisional application No. 62/936,076, filed on Nov. 15, 2019.

(51) Int. Cl.
*C09D 11/50* (2014.01)
*B41M 5/28* (2006.01)

(52) U.S. Cl.
CPC ............. *C09D 11/50* (2013.01); *B41M 5/287* (2013.01)

(58) Field of Classification Search
None
See application file for complete search history.

(56) References Cited

U.S. PATENT DOCUMENTS 5,916,671 A * 6/1999 Dauber ...................... C08J 9/32
428/319.3
5,955,091 A * 9/1999 Hansenne ................ A61K 8/29
424/59

(Continued)

FOREIGN PATENT DOCUMENTS

EP 0630757 A1 * 12/1994 ............ B41M 5/287

*Primary Examiner* — Peter A Salamon

(57) ABSTRACT

A PTSM-coated expandable microsphere comprises a polymer shell enclosing an interior volume containing at least one blowing agent. The polymer shell has an outer surface with photothermal susceptor material disposed on at least a portion thereof. If heated to at least one temperature greater than 25° C., each of the expandable microspheres expands, but does not rupture, the polymer shell by a sufficient amount to at least double the interior volume. A markable comprises a substrate and a viewable layer secured thereto. The viewable layer comprises a binder material retaining the PTSM-coated expandable microspheres. A method of marking a markable article comprises imagewise exposing the PTSM-coated expandable microspheres of the markable article to at least sufficient electromagnetic radiation to cause the PTSM-coated expandable microspheres to expand thereby creating a predetermined image. A marked article preparable according to the method is also disclosed.

1 Claim, 3 Drawing Sheets

(56)             References Cited

U.S. PATENT DOCUMENTS

| | | | |
|---|---|---|---|
| 2003/0060522 A1* | 3/2003 | Czaplicki | C08J 9/32 |
| | | | 521/50 |
| 2003/0095944 A1* | 5/2003 | Midha | A61Q 5/12 |
| | | | 424/70.31 |
| 2003/0157295 A1* | 8/2003 | Burns, Jr. | D06N 7/0086 |
| | | | 428/95 |
| 2007/0037704 A1* | 2/2007 | Rizkalla | C07D 301/10 |
| | | | 501/83 |

\* cited by examiner

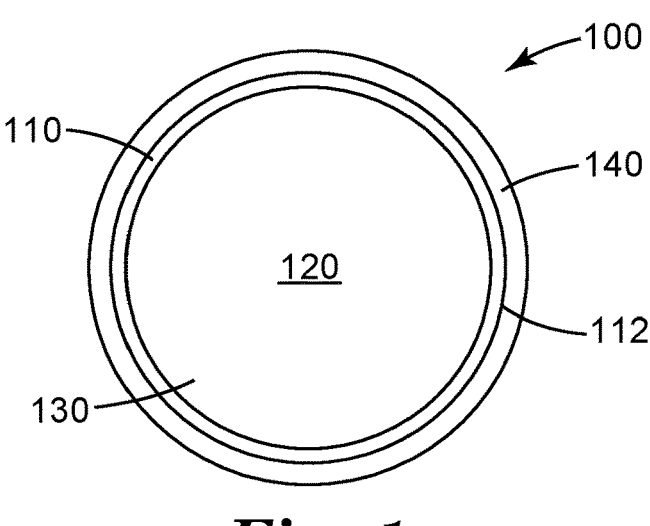
*Fig. 1*
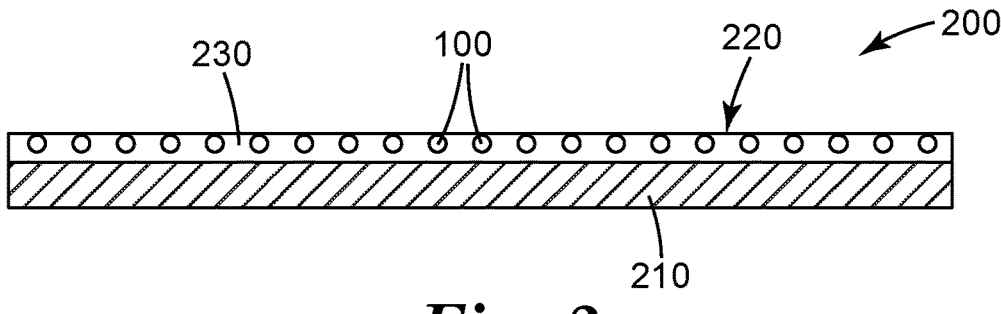
*Fig. 2*
*Fig. 3*

1.00mm 1.00mm 1000.00μm

EXPANDABLE MICROSPHERE, MARKABLE ARTICLE, MARKED ARTICLE, AND METHOD OF MAKING THE SAME

CROSS-REFERENCE TO RELATED APPLICATIONS

This application is a national stage filing under 35 U.S.C. 371 of PCT/IB2020/060544, filed Nov. 9, 2020, which claims the benefit of Provisional Application No. 62/936, 076, filed Nov. 15, 2019.

TECHNICAL FIELD

The present disclosure broadly relates to materials and methods for tracking and counterfeit detection of articles.

BACKGROUND

Marking of commercial goods is used provide tracking information during and after their manufacture. There is also a continuing need to improve materials/lot tracking methods. For example, if a product fails, it is helpful to be able to trace the history of the parts involved to learn the root cause of failure.

For popular brands, counterfeiting of commercial goods is a chronic problem. Unscrupulous manufacturers may try to pass off inferior products off as a more popular brand, potentially cutting into that brand's sales without offering the high quality product customers expect.

SUMMARY

There is a continuing need for new materials and methods for tracking and counterfeit detection. The present inventors have discovered that both problems can be solved through dynamically patterned foaming using, e.g., from a laser, or by use of a photomask between the article to be foamed and a light source. The resulting patterned foam layer provides optical contrast allowing for easy visual verification of brand quality. The dynamic capabilities of laser processing permit flexible pattern selection, making it possible to create lot identification patterns on roll-to-roll manufactured material and enables lot tracking at the inch/foot-scale instead of a jumbo roll scale.

In one aspect, the present disclosure provides a PTSM-coated expandable microsphere comprising a polymer shell enclosing an interior volume containing at least one blowing agent, wherein the polymer shell has an outer surface with photothermal susceptor material disposed on at least a portion thereof, and wherein, if heated to at least one temperature greater than 25° C., the polymer shell expands, but does not rupture, by a sufficient amount to at least double the interior volume.

In another aspect, the present disclosure provides a markable article comprising a substrate and a viewable layer secured to the substrate, wherein the viewable layer comprises a binder material retaining PTSM-coated expandable microspheres, wherein on a respective basis, each PTSM-coated expandable microsphere comprises a polymer shell enclosing an interior volume containing at least one blowing agent, and each polymer shell has an outer surface with photothermal susceptor material disposed on at least a portion thereof, and wherein, if heated to at least one temperature greater than 25° C., each of the PTSM-coated expandable microspheres expands, but does not rupture, the polymer shell by a sufficient amount to at least double the interior volume.

In another aspect, the present disclosure provides a method of marking a markable article, the method comprising:

providing the markable article, wherein the markable article comprises a substrate and a viewable layer secured to the substrate, wherein the viewable layer comprises a binder material retaining PTSM-coated expandable microspheres, wherein on a respective basis, each PTSM-coated expandable microsphere comprises a polymer shell enclosing an interior volume containing at least one blowing agent, and each polymer shell has an outer surface with photothermal susceptor material disposed on at least a portion thereof; and imagewise exposing the PTSM-coated expandable microspheres to at least sufficient electromagnetic radiation to cause the PTSM-coated expandable microspheres to expand thereby creating a predetermined image.

In yet another aspect, the present disclosure provides a marked article comprising a substrate and a viewable layer secured to the substrate, wherein the viewable layer comprises a binder material retaining PTSM-coated expanded polymer microspheres arranged to form a predetermined image, wherein on a respective basis, each PTSM-coated expanded microsphere comprises a polymer shell enclosing an interior volume, and wherein the polymer shell has an outer surface with photothermal susceptor material disposed on at least a portion thereof.

Advantageously, PTSM-coated expandable microspheres according to the present disclosure (i.e., having photothermal susceptor material disposed on the polymer shell) exhibit expansion more rapidly when exposed to electromagnetic radiation as compared to corresponding expandable microspheres without the photothermal susceptor material (CEMS) and/or exhibit a higher percentage of particles that expand at a given electromagnetic radiation energy density. Furthermore, expandable microspheres according to the present disclosure can be expanded using a high intensity flashlamp in microseconds.

Under some conditions, CEMS were able to be expanded by the flashlamp as well; however, the coated particles required less energy to cause expansion. Moreover, when compounded into acrylate adhesives, only PTSM-coated expandable microspheres were successfully expanded using the flashlamp. Additionally, an unexpected benefit of using PTSM-coated expandable microspheres is that the color of the final, expanded particles are significantly lighter than the unexpanded PTSM-coated expandable microspheres, which provides a visual indication that expansion has taken place.

Features and advantages of the present disclosure will be further understood upon consideration of the detailed description as well as the appended claims.

BRIEF DESCRIPTION OF THE DRAWINGS

FIG. 1 is schematic cross-sectional view of an exemplary expandable microsphere 100 according to the present disclosure;

FIG. 2 is a schematic side view of an exemplary markable article 200 according to the present disclosure;

FIG. 3 is a schematic process flow diagram depicting an exemplary method 300 of making marked article 400 according to the present disclosure.

Figure 4:
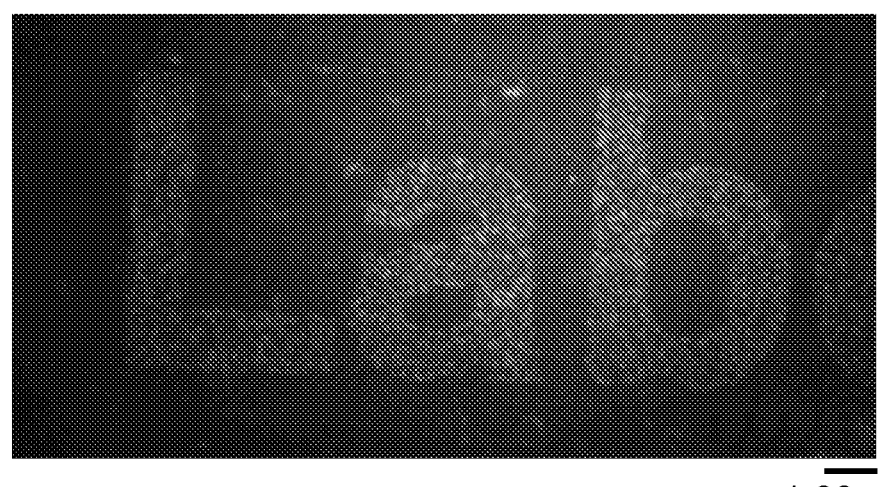
FIG. 4 is an optical micrograph of the marked article prepared in Example 16.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1, exemplary PTSM-coated expandable microsphere 100 according to the present disclosure comprises a polymer shell 110 enclosing an interior volume 120 containing at least one blowing agent 130. Polymer shell 110 has an outer surface 112 with photothermal susceptor material 140 disposed on at least a portion thereof. If polymer shell 110 is heated to at least one temperature greater than 25° C., the PTSM-coated expandable microsphere expands, but does not rupture, the polymer shell by a sufficient amount to increase the interior volume by at least two times (i.e., ≥2×), preferably (preferably ≥3×, ≥5×, ≥10×, ≥15×, ≥20×, ≥30×, ≥40×, ≥50×, or even >100×).

PTSM-coated expandable microspheres according to the present disclosure can be made, for example, by depositing photothermal susceptor material (e.g., metal or metal oxide) on the outer surface of conventional expandable microspheres having a polymer (preferably thermoplastic) shell that encloses an interior volume containing a blowing agent that exerts outward pressure at a activation temperature, e.g., a Vicat softening point (e.g., according to ASTM method D1525-17e1, "Standard Test Method for Vicat Softening Temperature of Plastics"), a glass transition temperature ($T_g$), or a melt transition temperature ($T_m$), wherein the polymer shell has sufficient ductility to expand. The polymer shell of the expandable microspheres is often made of a copolymer of monomers such as vinylidene chloride, acrylonitrile, methacrylonitrile, and/or methyl methacrylate. Other monomers that have been used are styrene or other monomers based on a styrene core such as o-chlorostyrene, ethyl methacrylate or other alkyl methacrylates, and/or vinyl ethers. They can also include crosslinkable monomers, such as (meth)acrylic acid, divinylbenzene, ethylene glycol dimethacrylate, or trimethylolpropane triacrylate. For details concerning expandable microspheres can be found in, for example, U.S. Pat. No. 3,615,972 B2 (Morehouse, Jr. et al.), U.S. Pat. No. 6,509,384 B2 (Kron et al.) and U.S. Pat. Appln. Publ. Nos. 2007/0287776 A1 (Nordin et al.), 2013/0065975 A1 (Natsui et al.). The blowing agent may be a solid, volatilizable liquid, or gas at room temperature. Upon heating to the activation temperature the blowing agent generates gas which exerts pressure against the polymer shell and causes it to expand. As used herein, the term "volatilizable liquid" refers to a liquid that has a normal boiling point at or below (preferably at least 20° C. or even at least 30° C. below) that temperature where the polymer shell is capable of expanding.

Exemplary gaseous blowing agent include isobutane, butane, and propane. Gaseous blowing agent (i.e., materials that are have normal boiling point below 20° C.) may be contained under pressure sufficient to render them liquid at ambient temperatures. Preferably, the blowing agent is a gas or volatilizable liquid. Exemplary gases include isobutene, propane, neopentane, butane, or isobutane. Exemplary volatilizable liquids include hydrocarbons including pentane, isopentane, hexane and isomers thereof, octane and isooctane.

Expandable microspheres can be made according to well-known methods such as, for example, those described in U.S. Pat. No. 3,615,972 (Morehouse, Jr. et al.), U.S. Pat. No. 5,180,752 (Melber et al.), U.S. Pat. No. 5,397,611 (Wong), U.S. Pat. No. 5,580,656 (Melber), and U.S. Pat. No. 7,368,167 (Johnston), or obtained from commercial suppliers.

Examples of commercially available thermally expandable microspheres include those available under the trade designations MATSUMOTO MICROSPHERES from Matsumoto Yushi-Seiyaku Co., Osaka, Japan (e.g., Matsumoto Microsphere F-30D, Matsumoto Microsphere F-50D, Matsumoto Microsphere F-80SD, and Matsumoto Microsphere F-48D), ADVANCELL EM series (from Sekisui Chemical Co., Ltd., Osaka, Japan), EXPANCEL DU series from Nouryon, Sundsvall, Sweden (e.g., EXPANCEL 031 DU 40, EXPANCEL 051 DU 40, EXPANCEL 920 DU 40, EXPANCEL 930 DU 120, and EXPANCEL 951 DU 120) and DUALITE U series from Chase Corporation, Greenville, South Carolina (e.g., DUALITE U010-185D).

In unexpanded form, the expandable microspheres can be made in a variety of sizes, those readily available in commerce being most often on the order of 2 to 100 microns, particularly 10 to 30 microns. When expanded, these materials will have bead diameters on the order of about 10 to 300 microns, most commonly about 50 to 250 microns, and most often about 100 to 200 microns. Microspheres can typically be made from as small as about 0.1 microns, up to as large as about 1 millimeter, in diameter, before expansion.

Exampled microspheres may be converted to PTSM-coated expandable microspheres by any suitable method. Two preferred methods are physical vapor deposition (PVD), and surface deposition of metallic nanowires, or metal and/or metal oxide nanoparticles, from a liquid dispersion and isolation of the coated microspheres by filtration; for example, as described in the Examples hereinbelow. Methods of PVD are well known in the art, and are described, for example, in U.S. Pat. No. 8,698,394 (McCutcheon et al.).

The photothermal susceptor material may be any inorganic material that exhibits light absorption that is tuned to a wavelength or wavelengths of light that is used to cause expansion of the PTSM-coated expandable microspheres. Such inorganic materials may include, for example, metals, metalloids, compound semiconductors, ceramics, and carbon. The inorganic susceptor material is typically present as a coating or deposit on or adjacent to the expandable microspheres, preferably in the form of particles, nanowires, (e.g., nanoparticles), or a thin film, although this is not a requirement. As used herein, the term "nanoparticle" relates to a particle that includes at least one dimension that is less than 100 nanometers. Useful particles include, for example, spherical or nearly spherical particles, platelets (e.g., nanoplatelets), and wires or fibers (e.g., nanowires).

In some embodiments the photothermal susceptor material is a metal selected from the group consisting of Cu, Ag, Au, Ni, Pd, Pt, Ti, Zr, Cr, Mo, W, Fe, Ru, Al, and combinations (e.g., mixtures, alloys or intermetallic compounds) thereof. Preferably, the photothermal susceptor material is a metal selected from the group consisting of Au, Ag, Ni, Ti, Ru, Pt, Pd, Cu and combinations (e.g., mixtures, alloys or intermetallic compounds) thereof.

In some embodiments the photothermal susceptor material comprises a metalloid selected from the group consisting of B, Si, Ge, As, Sb, Te, and combinations (e.g., mixtures, alloys or compounds) thereof. Preferably, the photothermal susceptor material is a metalloid selected from the group consisting of Si, Ge, and combinations (e.g., mixtures or alloys) thereof.

In some embodiments the photothermal susceptor material comprises a compound semiconductor selected from the group consisting of II-VI compounds, III-V compounds, and combinations (e.g., mixtures or alloys) thereof. Preferably, the photothermal susceptor material is a compound semiconductor selected from the group consisting of InP, ZnS, CdS, ZnO, GaAs, and combinations (e.g., mixtures or alloys) thereof.

In some embodiments the photothermal susceptor material comprises a ceramic selected from the group consisting of oxides, nitrides, borides, and carbides, including polycrystalline ceramics, glass, and glass ceramics. Preferably, the photothermal susceptor material is a ceramic selected from the group consisting of iron oxide, cobalt oxide, manganese oxide, ruthenium oxide, titanium oxide (e.g., reduced titanium oxide), copper oxide, silver oxide, and combinations (e.g., mixtures, solid solutions, or compounds) thereof.

In some embodiments the photothermal susceptor material comprises carbon selected from the group consisting of graphite, graphene, carbon black, carbon nanotubes, diamond (e.g., doped), and combinations (e.g., mixtures) thereof.

Preferred photothermal susceptor materials include silver nanowires, copper nanowires, nickel nanowires, gold nanoparticles, silicon nanoparticles, graphite particles, and iron oxide particles (e.g., $Fe_3O_4$ nanoparticles). Other preferred photothermal susceptor materials include silver thin film, silver oxide thin film, titanium thin film, titanium oxide thin film, and iron oxide thin film.

In some embodiments, the photothermal susceptor material comprises metal nanowires. Metal nanowires can be made by many methods known in the art; for example, according to methods described by Fahad et al. in "Recent progress in the synthesis of silver nanowires and their role as conducting materials", *Journal of Materials Science,* 2019, Vol. 54, pp. 997-1035.

Many types of metal nanowires are typically commercially available in the form of an aqueous dispersion wherein a polymer (e.g., polyvinylpyrrolidone) is adsorbed onto the surface of the silver nanowires in order to render the dispersion stable. Polymer-coated silver nanowires are described in U.S. Pat. No. 10,391,555 (Ida et al.).

Metal nanowire dispersion may contain additives and binders to control viscosity, corrosion, adhesion, and nanowire dispersion. Examples of suitable additives and binders include, but are not limited to, carboxy methyl cellulose (CMC), 2-hydroxy ethyl cellulose (HEC), hydroxy propyl methyl cellulose (HPMC), methyl cellulose (MC), poly vinyl alcohol (PVA), tripropylene glycol (TPG), and xanthan gum (XG), and surfactants such as ethoxylates, alkoxylates, ethylene oxide and propylene oxide and their copolymers, sulfonates, sulfates, disulfonate salts, sulfosuccinates, phosphate esters, and fluorosurfactants.

The metal nanowire concentration in the dispersion can affect or determine parameters such as thickness, conductivity (including surface conductivity), optical transparency, and mechanical properties of the nanowire network layer. The percentage of the solvent can be adjusted to provide a desired concentration of the nanowires in the dispersion. In preferred embodiments the relative ratios of the other ingredients, however, can remain the same. In particular, the ratio of the surfactant to the viscosity modifier is preferably in the range of about 80 to about 0.01; the ratio of the viscosity modifier to the metal nanowires is preferably in the range of about 5 to about 0.000625; and the ratio of the metal nanowires to the surfactant is preferably in the range of about 560 to about 5. The ratios of components of the dispersion may be modified depending on the substrate and the method of application used. The preferred viscosity range for the metal nanowire dispersion is between about 1 and 100 cP (1 and 100 mPas-sec).

Following the coating of the expandable microsphere(s), the volatile liquid can be removed by evaporation. The evaporation can be accelerated by heating {e.g., baking).

Examples of suitable coating compositions containing metal (e.g., silver nanowires) are described in U.S. Pat. Appl. Publ. Nos. 2007/0074316 (Alden et al.) and 2009/0283304 (Winoto).

Silver nanowire solvent dispersions and inks are commercially available, for example, from Novarials Corporation, Woburn, Massachusetts, under the trade designation NOVAWIRE-Ag in grades A20 (20 nm×20 microns), A30 (30 nm×30 microns), A40 (40 nm×40 microns), A50 (50 nm×40 microns), A60 (60 nm×45 microns), A70 (70 nm×50 microns), A100UL (100 nm×150 microns), and form Cambrios Advanced Materials, Sunnyvale, California Silver nanowires are also available in various ink formulations that also include a polymeric bonder material. Novarials Corporation also supplies copper, cobalt, nickel, iron, and gold nanowires, as well as semiconductor nanowires, and certain ceramic nanowires that may be suitable.

In some preferred embodiments, metal nanowires are deposited onto the shell of expandable microspheres via solution phase association of the silver nanowires and the expandable particle followed by filtering.

The photothermal susceptor material disposed on the polymer shell (i.e., a silver layer or coating) may be conformal or non-conformal, continuous or discontinuous, complete or incomplete, and uniform or non-uniform in thickness. Preferably, the photothermal susceptor material comprises a layer that is conformal. In some preferred embodiments, the photothermal susceptor material is substantially uniform and/or complete. In some embodiments, the photothermal susceptor material has a layer thickness of about 1 to 1000 nm, preferably about 1 to 500 nm, and more preferably about 1 to 300 nm. In some embodiments, the PTSM-coated expandable microspheres comprise 0.1 to 10 weight percent of silver. In some embodiments, the PTSM-coated expandable microspheres comprise 0.1-20 weight percent NiZn-ferrite nanoparticles.

Referring now to FIG. 2. a markable article comprises a markable article 200 comprising a substrate 210 and a viewable layer 220 secured to the substrate 210. The viewable layer 220 comprises a binder material 230 retaining PTSM-coated expandable microspheres 100.

The substrate may comprise any solid material capable of supporting the viewable layer. Exemplary materials include plastic, metal, wood, cured resin, paper, glass, ceramic, porcelain, and combinations thereof. In many embodiments, the substrate comprises a polymer film.

In some embodiments, the markable article comprises an intermediate fiduciary document (e.g., a bond note) or identification document (e.g., a passport or driver's license). In these cases, the PTSM-coated unexpanded microspheres can be exposed to electromagnetic radiation in an imagewise pattern to generate an anti-counterfeiting feature.

The viewable layer is secured to the substrate; for example, by coating an ink containing the PTSM-coated unexpanded microspheres and a binder material, and evaporating volatile liquid components in the ink. Examples of inks may include inkjet inks and screen-printing inks. Exemplary binder materials may comprise organic polymers (thermoplastic and/or thermosetting), fillers, surfactants, thickeners, and colorants. Inks and other coatable compositions may be coated out of solvent onto the substrate by, for example, brushing, roll coating, rod coating, sheet coating, gravure coating, knife coating, or spraying. The viewable layer can also be secured to the substrate by deposition of the PTSM-coated unexpanded microspheres and a binder material via extrusion or coating without the use of additional volatile liquid solvents. The binder material can be further cured, e.g. via crosslinking, after deposition onto the substrate providing final modulus of the binder material allows the PTSM-coated unexpanded microsphere to expand. The viewable layer can also be secured to the substrate by lamination.

PTSM-coated expandable microspheres according to the present disclosure are also useful as low density fillers after expansion. For example, PTSM-coated expandable microspheres have specific utility in the manufacture of acrylic foam tapes.

Markable articles according to the present disclosure can be converted to marked articles by the following method. Referring now to FIG. 3, an exemplary method 300 of marking a markable article, the method comprising: providing a markable article 200 comprising a substrate 210 and a viewable layer 220 secured to substrate 210, wherein the viewable layer comprises a binder material 230 retaining PTSM-coated expandable microspheres 100; and imagewise exposing the PTSM-coated expandable microspheres to at least sufficient electromagnetic radiation 390 to cause the PTSM-coated expandable microspheres to expand thereby creating a marked article 400 having a predetermined image 350.

The electromagnetic radiation may be supplied by any suitable source that supplies sufficient power to heat and expand the PTSM-coated expandable microspheres including, for example, lasers (ultraviolet, visible, or infrared), broad spectrum flashlamps (e.g., xenon flashlamps), and high-intensity continuous lamps (e.g., high-pressure mercury arc lamps), Advantageously, the present inventors have discovered that even very short pulses of broad spectrum flashlamps through a mask aperture can be used to cause expansion of the PTSM-coated expandable microcapsules to generate a predetermine image. Alternatively, the geometry of the lamp relative to the markable substrate can be adjusted such that there is a non-uniform energy density across the substrate. In this case, only regions of the markable substrate that receive sufficient energy to induce PTSM-coated expandable microsphere will expand, thus resulting in a patterned surface.

The predetermined image may be generated, for example, by directing a laser beam along a predetermined trace, or by flood exposure through a mask (e.g., using a high-intensity flashlamp). Typically, exposure times may be as short as several microseconds in carrying out the process.

Referring again to FIG. 3, marked article 400 marked article comprises a substrate 210 and a viewable layer 420 secured to the substrate 210. Viewable layer 420 comprises a binder material 230 retaining expanded PTSM-coated microspheres 480 arranged to form a predetermined image. In unexposed areas the viewable layer 420 also comprises unexpanded PTSM-coated expandable microspheres 100, The PTSM-coated expandable microspheres (and also typically the expanded microspheres) have an outer surface with photothermal susceptor material (in some embodiments in combination with a second polymer binder) disposed on at least a portion thereof.

SELECT EMBODIMENTS OF THE PRESENT DISCLOSURE

In a first embodiment, the present disclosure provides a PTSM-coated expandable microsphere comprising a polymer shell enclosing an interior volume containing at least one blowing agent, wherein the polymer shell has an outer surface with photothermal susceptor material disposed on at least a portion thereof, and wherein, if heated to at least one temperature greater than 25° C., the polymer shell expands, but does not rupture, by a sufficient amount to at least double the interior volume.

In a second embodiment, the present disclosure provides a PTSM-coated expandable microsphere according to the first embodiment, wherein the photothermal susceptor material comprises metal nanowires.

In a third embodiment, the present disclosure provides a PTSM-coated expandable microsphere according to the first or second embodiment, wherein the photothermal susceptor material comprises a conformal layer.

In a fourth embodiment, the present disclosure provides a PTSM-coated expandable microsphere according to any of the first to third embodiments, wherein the conformal layer is substantially uniform and complete.

In a fifth embodiment, the present disclosure provides a PTSM-coated expandable microsphere according to any of the first to fourth embodiments, wherein the photothermal susceptor material comprises a conformal metal or metal oxide layer enclosing the polymer shell.

In a sixth embodiment, the present disclosure provides a PTSM-coated expandable microsphere according to any of the first to fifth embodiments, wherein the at least one blowing agent comprises a gas.

In a seventh embodiment, the present disclosure provides a PTSM-coated expandable microsphere according to any of the first to sixth embodiments, wherein the at least one blowing agent comprises a volatilizable liquid.

In an eighth embodiment, the present disclosure provides a markable article comprising a substrate and a viewable layer secured to the substrate, wherein the viewable layer comprises a binder material retaining PTSM-coated expandable microspheres according to any of the first to seventh embodiments.

In a ninth embodiment, the present disclosure provides a markable article according to the eighth embodiment, wherein the viewable layer is an outermost layer.

In a tenth embodiment, the present disclosure provides a markable article according to the eighth or ninth embodiment, wherein the binder material comprises organic polymer.

In an eleventh embodiment, the present disclosure provides a markable article according to any of the eighth to tenth embodiments, wherein the binder material further comprises at least one of a plasticizer, a tackifier, a flame retardant, or an antioxidant.

In a twelfth embodiment, the present disclosure provides a method of marking a markable article, the method comprising:

providing the markable article, wherein the markable article comprises a substrate and a viewable layer secured to the substrate, wherein the viewable layer comprises a binder material retaining PTSM-coated expandable microspheres, wherein on a respective basis, each PTSM-coated expandable microsphere comprises a polymer shell enclosing an interior volume containing at least one blowing agent, and each polymer shell has an outer surface with photothermal susceptor material disposed on at least a portion thereof; and imagewise exposing the PTSM-coated expandable microspheres to at least sufficient electromagnetic radiation to cause the PTSM-coated expandable microspheres to expand thereby creating a predetermined image.

In a thirteenth embodiment, the present disclosure provides a method according to the twelfth embodiment, wherein, if heated to at least one temperature greater than 25° C., each of the polymer shell expands, but does not rupture, by a sufficient amount to at least double the interior volume.

In a fourteenth embodiment, the present disclosure provides a method according to the twelfth or thirteenth embodiment, wherein the electromagnetic radiation comprises ultraviolet, visible and infrared electromagnetic radiation.

In a fifteenth embodiment, the present disclosure provides a method according to any of the twelfth to fourteenth embodiment, wherein the electromagnetic radiation is coherent.

In a sixteenth embodiment, the present disclosure provides a method according to the any of the twelfth to fifteenth embodiments, wherein the photothermal susceptor material comprises metal nanowires.

In a seventeenth embodiment, the present disclosure provides a method according to the any of the twelfth to sixteenth embodiments, wherein the photothermal susceptor material comprises a conformal metal or metal oxide layer enclosing the polymer shell.

In an eighteenth embodiment, the present disclosure provides a method according to the any of the twelfth to seventeenth embodiments, wherein the photothermal susceptor material comprises a substantially uniform and complete photothermal susceptor material.

In a nineteenth embodiment, the present disclosure provides a method according to the any of the twelfth to eighteenth embodiments, wherein the photothermal susceptor material comprises a conformal metal or metal oxide layer enclosing the polymer shell.

In a twentieth embodiment, the present disclosure provides a method according to the any of the twelfth to nineteenth embodiments, wherein the at least one blowing agent comprises a gas.

In a twenty-first embodiment, the present disclosure provides a method according to the any of the twelfth to twentieth embodiments, wherein the at least one blowing agent comprises a volatilizable liquid.

In a twenty-second embodiment, the present disclosure provides a method according to the any of the twelfth to twenty-first embodiment, wherein the predetermined image comprises a counterfeit detection feature.

In a twenty-third embodiment, the present disclosure provides a method according to the any of the twelfth to twenty-second embodiments, wherein the predetermined image comprises at least one of product description and product lot information.

In a twenty-fourth embodiment, the present disclosure provides a method according to the any of the twelfth to twenty-third embodiments, wherein the viewable layer is an outermost layer.

In a twenty-fifth embodiment, the present disclosure provides a method according to the any of the twelfth to twenty-fourth embodiments, wherein the binder material comprises organic polymer.

In a twenty-sixth embodiment, the present disclosure provides a method according to the any of the twelfth to twenty-fifth embodiments, wherein the electromagnetic radiation passes through a mask before said imagewise exposing the PTSM-coated expandable microspheres.

In a twenty-seventh embodiment, the present disclosure provides a marked article comprising a substrate and a viewable layer secured to the substrate, wherein the viewable layer comprises a binder material retaining PTSM-coated expanded polymer microspheres arranged to form a predetermined image, wherein on a respective basis, each PTSM-coated expanded microsphere comprises a polymer shell enclosing an interior volume, and wherein the polymer shell has an outer surface with photothermal susceptor material disposed on at least a portion thereof.

In a twenty-eighth embodiment, the present disclosure provides a marked article according to the twenty-seventh embodiment, wherein the photothermal susceptor material comprises metal nanowires.

In a twenty-ninth embodiment, the present disclosure provides a marked article according to the twenty-seventh or twenty-eighth embodiment, wherein the photothermal susceptor material comprises a conformal metal or metal oxide layer.

In a thirtieth embodiment, the present disclosure provides a marked article according any of the twenty-seventh to twenty-ninth embodiments, wherein the predetermined image comprises a counterfeit detection feature.

In a thirty-first embodiment, the present disclosure provides a marked article according any of the twenty-seventh to thirtieth embodiments, wherein the predetermined image comprises at least one of product description and product lot information.

In a thirty-second embodiment, the present disclosure provides a marked article according any of the twenty-seventh to thirty-first embodiments, wherein the viewable layer is an outermost layer.

In a thirty-third embodiment, the present disclosure provides a marked article according any of the twenty-seventh to thirty-second embodiments, wherein the binder material comprises organic polymer.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. TABLE 1, below, reports materials and abbreviations used in the examples.

TABLE 1

| Abbreviation | Description and Source |
|---|---|
| U010-185D | DUALITE U010-185D, dry expandable microsphere with a $T_{max}$ of 185-195° C., having a shell composition containing a copolymer of acrylonitrile and methacrylonitrile and a core of isopentane, obtained from Chase Corporation, Greenville, South Carolina |

TABLE 1-continued

| Abbreviation | Description and Source |
| --- | --- |
| 920DE80 | EXPANCEL 920 DE 80 d30, dry expanded microspheres with an average particle size of 55-85 microns, having a copolymer shell and a core of isopentane, available from Nouryon, Sundsvall, Sweden |
| 031DU40 | EXPANCEL 031 DU 40, dry expandable microspheres with a $T_{start}$ of 80-95° C. and a $T_{max}$ of 120-135° C., having a copolymer shell and a core of isopentane, available from Nouryon |
| 051DU40 | EXPANCEL 051 DU 40, dry expandable microspheres with a $T_{start}$ of 106-111° C. and a $T_{max}$ of 144-153° C., having a copolymer shell and a core of isopentane, available from Nouryon |
| 920DU40 | EXPANCEL 920 DU 40, dry expandable microspheres with a $T_{start}$ of 123-133° C. and a $T_{max}$ of 168-178° C., having a copolymer shell and methacrylonitrile and a core of isopentane, available from Nouryon |
| 930DU120 | EXPANCEL 930 DU 120, dry expandable microspheres with a $T_{start}$ of 122-132° C. and a $T_{max}$ of 192-207° C., having a copolymer shell and a core of isopentane, available from Nouryon |
| 951DU120 | EXPANCEL 951DU 120, dry expandable microspheres with a $T_{start}$ of 133-143° C. and a $T_{max}$ of 190-205° C., having a copolymer shell and a core of isopentane, available from Nouryon |
| IOA | Isooctyl acrylate, an alkyl acrylate monomer obtained from Scientific Polymer Products, Inc., Ontario, New York |
| AA | Acrylic acid, available from Sartomer, Exton, Pennsylvania |
| iBoA | Isobornyl acrylate, obtained from TCI Chemicals, Portland, Oregon |
| HEA | 2-Hydroxyethyl acrylate, available from Alfa Aesar, Ward Hill, Massachusetts |
| HDDA | 1,6-Hexanediol diacrylate, available from Sartomer |
| PI-1 | IRGACURE 651, a photoinitiator obtained from BASF Corp., Florham Park, New Jersey |
| Ink A | Cambrios CLEAROHM INK A conductive ink, a 0.5 weight percent silver nanowire suspension containing polymer binder obtained from Cambrios Advanced Materials, Sunnyvale, California |
| NiZn-ferrite | $NiZnFe_4O_4$ nanopowder, < 100 nm particle size, available under the product number 641699 from Sigma Aldrich, St. Louis, MO |
| Na-CMC | Sodium carboxymethylcellulose, available under the product name 7ULC from Ashland, Inc, Covington, KY |

General Procedure for Physical Vapor Deposition (PVD) of Silver

Expandable particles were silver coated using PVD generally according to the method disclosed in, U.S. Pat. No. 8,698,394 (MCutcheon et al.). A 5 in×12 in (12.7 cm×30.5 cm) rectangular silver sputter target (0.5 in (1.3 cm) thickness) was used. Expandable polymer microspheres were loaded into a one-gal (3.79-L) particle agitator assembly positioned inside the vacuum chamber. The vacuum chamber was pumped down to a base pressure of $4\times10^{-5}$ mPa. Silver was sputtered at 0.50 kW at an argon sputtering gas pressure of 3.3 Pa while tumbling at 4 rpm to produce silver-coated polymer microspheres.

Preparative Example 1 (PE-1)

031DU40 (5 g, dry powder) was suspended in 20.5 mL deionized water and 27.5 g of Ink A was added (0.14 g Ag). The suspension was stirred with a magnetic stir bar for 10 min, then the solids were filtered off using vacuum filtration with Whatman No. 2 paper. The recovered solids were dried in a nitrogen box overnight. The content of silver nanowires as a percentage of the total weight of the resultant silver-coated expandable microspheres was 2.7 weight percent.

Preparative Example 2 (PE-2)

PE-2 was prepared in the same manner as PE-1, except the 031DU40 was suspended in 21 mL deionized water and 27.5 g of a pre-diluted suspension of silver nanowires given by mixing Ink A with a 90:10 w/w mixture of water:IPA in proportions of 1 to 2 by weight, respectively (0.046 g of silver nanowires). The content of silver nanowires as a percentage of the total weight of the resultant silver-coated expandable microspheres was 0.9 weight percent.

Preparative Example 3 (PE-3)

PE-3 was prepared in the same manner as PE-1, except that 930DU120 was used instead of 031DU40, and the suspension was stirred for 75 min before filtration. The content of silver nanowires as a percentage of the total weight of the resultant silver-coated expandable microspheres was 2.7 weight percent.

Preparative Example 4 (PE-4)

U010-185D (564 g) were coated with silver for 10 h via the *General Procedure for Physical Vapor Deposition of Silver*. The density of PE-4 was 1.111 g/cc and that of the uncoated expandable microspheres was 1.10 g/cc. The weight percent of metal is calculated to be 1%.

Preparative Example 5 (PE-5)

PE-4 (220 mL) was recoated with silver for 10 h via the general coating procedure. The density of PE-5 was 1.158 g/cc and that of the uncoated expandable microspheres was 1.10 g/cc. The weight percent of metal is calculated to be 5% over two coated cycles.

Preparative Example 6 (PE-6)

920DE80 (46.5 g) was coated with silver for 18 h via the general coating procedure. The coated sample was sieved with 60 mesh and the resistivity of the collected powder was 3 Ω·cm.

Preparative Example 7 (PE-7)

A composite film composed of 95.2 weight percent acrylic polymer filled with 4.8 weight percent U010-185D. The acrylic polymer was composed of 80 parts IOA, 10 parts of iBoA, 10 parts of HEA, and 0.05 parts of HDDA.

Preparative Example 8 (PE-8)

A composite film of the same composition as PE-7, except PE-4 was used instead of U010-185D.

Preparative Example 9 (PE-9)

A composite film of the same composition as PE-7, except PE-5 was used instead of U010-185D.

Preparative Example 10 (PE-10)

A composite film of the same composition as PE-7, except PE-6 was used instead of U010-185D.

Preparative Example 11 (PE-11)

A composite film of the same composition as PE-9, except the acrylic polymer was composed of 90 parts IOA and 10 AA.

Preparative Example (PE-12)

NiZn-Ferrite nanoparticles (0.29 g) was dispersed in a 5.7 wt. % solution of Na-CMC (9.04 g) by ball milling for three days with 6 mm diameter zirconium oxide milling media (400 g) and water (80.6 g). The three-day milling process yielded a homogenously brown aqueous dispersion. 930DU120 (2 g) was added to the dispersion with stirring for 3 min, followed by pouring into an aluminum pan at less then 2 mm liquid layer depth and dried in less then 15 min in an oven at 80° C. Pan-drying yielded brown flakes of material comprising the unexpanded expandable microspheres and the metal oxide nanoparticles adhered thereto with sodium carboxymethylcellulose polymeric binder. The content of metal oxide as a percentage of the total weight of the resultant metal oxide-coated expandable microspheres was 12.7 weight percent.

Comparative Example A (CE-A)

A layer of 031DU40, no more than 0.5 mm in thickness, at the bottom of a 20 mL aluminum weight dish was placed 7.6 cm directly underneath a LumaPro 300W Incandescent Clamp Light (Model 5AY60, Grainger, Inc, St. Paul, Minnesota) fitted with a 250 W Incandescent Heat Lamp (Model 250R40/10, Grainger Inc) and was exposed to the light source (energy output at 830 nm was measured to be 91.5 mW/cm$^2$ with a ThorLabs PM-100D meter equipped with an S121C optical sensor). The particles started to expand in 20 s.

Example 1 (EX-1)

EX-1 was prepared in the same way as CE-A, except PE-1 particles were used. The particles started to expand in 1 second.

Example 2 (EX-2)

EX-2 was prepared in the same way as CE-A, except PE-2 particles were used. The particles started to expand in 10 seconds.

Comparative Example B (CE-B)

CE-B was prepared the same way as CE-A, except the weight dish was placed 10.2 cm directly underneath the light source (energy output at 830 nm was measured to be 69.8 mW/cm$^2$). No visible change in particle volume was observed in 180 seconds of exposure.

Example 3 (EX-3)

EX-3 was prepared in the same way as CE-B, except PE-1 particles were used. The particles started to expand in 13 seconds.

Example 4 (EX-4)

EX-4 was prepared in the same way as CE-B, except PE-2 particles were used. The particles started to expand in 40 seconds.

Comparative Example C (CE-C)

CE-C was prepared the same way as CE-A, except U010-185D particles were used and the weight dish was placed 5.1 cm directly underneath the light source (energy output at 830 nm was measured to be 146 mW/cm$^2$). The particles partially expanded during 120 seconds of exposure.

Example 5 (EX-5)

EX-5 was prepared in the same way as CE-C, except PE-4 particles were used. The particles started to expand in 2.5 s and fully expanded in 15 seconds.

Example 6 (EX-6)

EX-6 was prepared in the same way as CE-C, except PE-5 particles were used. The particles started to expand in less than 1 second and fully expanded in less than 5 seconds.

Comparative Example D (CE-D)

CE-D was prepared the same way as CE-A, except a 2.54 cm strip of PE-7 with a thickness of 5 mil was placed 2.54 cm directly below the light source below the light source (energy output at 830 nm was measured to be 153 mW/cm$^2$). No expansion was observed after 300 seconds of exposure.

Example 7 (EX-7)

EX-7 was prepared in the same way as CE-D, except PE-8 film was used. The film started to expand in 18 seconds and fully expanded in 45 seconds.

Example 8 (EX-8)

EX-8 was prepared in the same way as CE-D, except PE-9 film was used. The film started to expand in 11 seconds and fully expanded in 25 seconds.

Comparative Example E (CE-E)

A strip of SCOTCH brand double-sided pressure-sensitive adhesive tape was adhered to a microscope slide and 031DU40 particles were sprinkled on top of the exposed tape. Particles that were not adhered to the adhesive were brushed off by hand. The sample was placed in the center stage of a S-2100 Sintering System with a LS-845 Linear Stage (Xenon Corporation, Wilmington, MA) with the sample placed perpendicular to the light source, which was used without a shim. The sample was exposed to a 3 ms flashlamp pulse at 2.25 kV (pulse energy density at sample 3.96 J/cm$^2$). Exposed and non-exposed particles were examined using a light microscope (model DM4000M, commercially available from Leica Microsystems, Inc., Buffalo Grove, Illinois) equipped with a digital camera (model DFC420, commercially available from Leica Microsystems, Inc., Buffalo Grove, Illinois). The particles were imaged under diffuse transmitted white light illumination. 27.4 percent of the particles were found to expand in the region that was exposed to light, no change occurred outside this region.

Comparative Example F (CE-F)

CE-F was prepared in the same way as CE-E, except 930DU120 particles were used. No particles were found to expand on the sample.

Comparative Example G (CE-G)

CE-G was prepared in the same way as CE-E, except 051DU40 particles were used. No particles were found to expand on the sample.

Comparative Example I (CE-H)

CE-H was prepared in the same way as CE-E, except 920DU40 particles were used. No particles were found to expand on the sample.

Comparative Example I (CE-I)

CE-I was prepared in the same way as CE-E, except 951DU120 particles were used. No particles were found to expand on the sample.

Example 9 (EX-9)

EX-9 was prepared in the same way as CE-E, except PE-1 particles were used. 72.2 percent of the particles expanded in the region that was exposed to light, no change occurred outside this region.

Example 10 (EX-10)

EX-10 was prepared in the same way as CE-E except PE-2 particles were used. 43.8 percent of the particles expanded in the region that was exposed to light, no change occurred outside this region.

Example 11 (EX-11)

EX-11 was prepared in the same way as CE-E except PE-3 particles were used. 97.4 percent of the particles expanded in the region that was exposed to light, no change occurred outside this region.

Comparative Example J (CE-J)

CE-J was prepared in the same manner as CE-E, except U010-185D particles were used and the sample was placed parallel to the light source. The sample was exposed to flashlamp pulses at various pulse durations, voltages, and shim heights as detailed in Table 2, which also reports the expansion results of the exposed particles.

Example 11 (EX-11)

EX-11 was prepared in the same way as CE-J, except PE-5 particles were used.

Example 12 (EX-12)

EX-12 was prepared in the same way as CE-J, except PE-4 particles were used.

TABLE 2

| EXAMPLE | PULSE DURATION, milliseconds | VOLTAGE, kV | SHIM HEIGHT, cm | DISTANCE FROM CENTER OF SAMPLE, inches (cm) | PULSE ENERGY DENSITY, J/cm$^2$ | EXPANSION RESULT |
|---|---|---|---|---|---|---|
| CE-J | 1 | 2.25 | 0 | 0 (0) | 1.31 | no change |
| | 1 | 2.25 | 0 | 1.5 (3.8) | 0.46 | no change |
| | 1.25 | 2.00 | 2 | 0 (0) | 0.26 | no change |
| | 1 | 2.00 | 2 | 0 (0) | 0.21 | no change |
| | 0.75 | 2.00 | 2 | 0 (0) | 0.16 | no change |
| EX-11 | 1 | 2.25 | 0 | 0 (0) | 1.31 | shells melted |
| | 1 | 2.25 | 0 | 1.5 (3.8) | 0.46 | complete |
| | 1 | 2.00 | 2 | 0 (0) | 0.21 | complete |
| | 1 | 2.00 | 2 | 1.5 (3.8) | 0.20 | complete |
| | 0.75 | 2.00 | 2 | 0 (0) | 0.16 | partial |
| EX-12 | 1 | 2.25 | 0 | 0 (0) | 1.31 | shells melted |
| | 1 | 2.25 | 0 | 1.5 (3.8) | 0.46 | complete |
| | 1.25 | 2.00 | 2 | 0 (0) | 0.26 | complete |
| | 1 | 2.00 | 2 | 0 (0) | 0.21 | partial |
| | 0.75 | 2.00 | 2 | 0 (0) | 0.16 | partial |

Comparative Example K (CE-K)

An approximately 2.54 cm strip of PE-7 was adhered to a microscope slide. The sample was exposed to a flashlamp in the same manner as CE-J, a 2 in (5.08 cm) shim was used. The sample was exposed to flashlamp pulses at various pulse durations and voltages as detailed in Table 3, which also reports the expansion results of the exposed particles and film thicknesses.

Comparative Example L (CE-L)

CE-L was prepared in the same manner as CE-K, except PE-10 film was used.

Example 13 (EX-13)

EX-13 was prepared in the same manner as CE-K, except PE-8 film was used.

Example 14 (EX-14)

EX-14 was prepared in the same manner as CE-K, except PE-9 film was used.

Example 15 (EX-15)

EX-15 was prepared in the same manner as CE-K, except PE-11 film was used.

Example 17 (EX-17)

Figure 5:
FIG. 5 is an optical micrograph of the marked article prepared in Example 17.

EX-17 was prepared in the same manner as EX-16, except PE-9 film was used. The laser was able to selectively pattern the sample by expanding the microspheres. Results are shown in FIG. 5.

Example 18 (EX-18)

Figure 6:
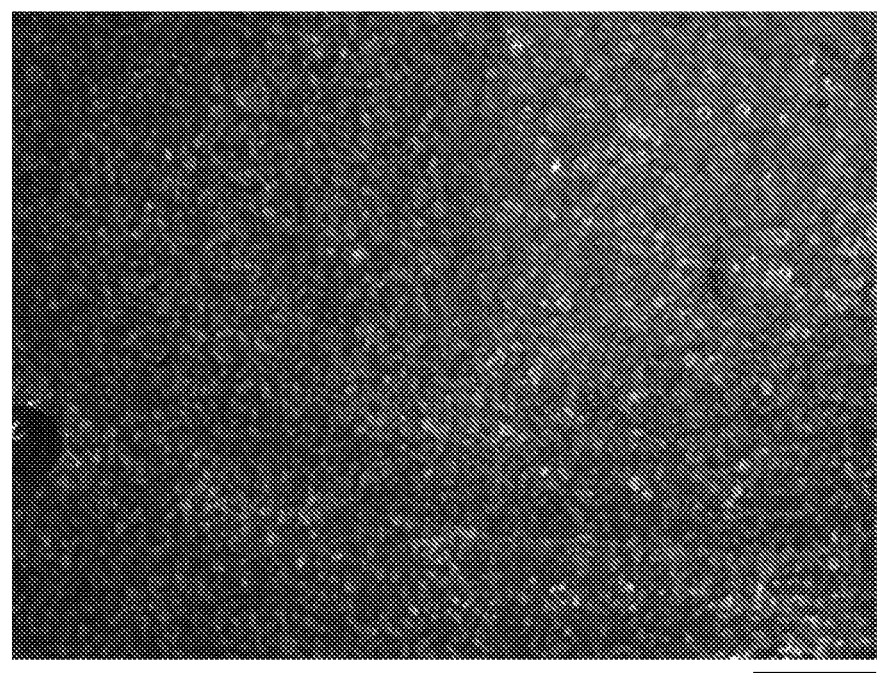
FIG. 6 is an optical micrograph of the marked article prepared in Example 18.

A 90 mil (2300 micron) film of PE-11 was exposed to a pulsed UV laser (355 nm wavelength) from an Avia 7 (Coherent Inc, Santa Clara, CA) with a pulse frequency of 80 KHz and a movement speed of 300 mm/s. The laser selectively activated the microspheres with a penetration depth of 13 mils (320 micron) and created features with a surface topographic height of 5.4 mil (137 microns). The patterned sample was imaged using a Keyence VHX-1000 digital microscope. Results are shown in FIG. 6.

Example 19 (EX-19)

EX-19 was prepared in the same manner as CE-E, except PE-12 particles were used. All particles imaged were found to expand.

All cited references, patents, and patent applications in this application that are incorporated by reference, are incorporated in a consistent manner. In the event of inconsistencies or contradictions between portions of the incor-

TABLE 3

| EXAMPLE | ADHESIVE THICKNESS, mil (microns) | PULSE DURATION, milliseconds | NUMBER OF PULSES | VOLTAGE, kV | PULSE ENERGY DENSITY, J/CM$^2$ | EXPANSION RESULT |
|---|---|---|---|---|---|---|
| CE-K | 3 (76) | 3 | 1 | 3.00 | 1.45 | No change |
| | 5 (130) | 3 | 1 | 3.00 | 1.45 | No change |
| CE-L | 3 (76) | 2 | 1 | 3.00 | 0.96 | No change |
| | 3 (76) | 3 | 1 | 3.00 | 1.45 | Shells melted |
| | 5 (130) | 2 | 1 | 3.00 | 0.96 | Shells melted |
| | 5 (130) | 3 | 1 | 3.00 | 1.45 | Shells melted |
| EX-13 | 3 (76) | 2 | 1 | 3.00 | 0.96 | Partial |
| | 3 (76) | 3 | 1 | 3.00 | 1.45 | Complete |
| | 5 (130) | 2 | 1 | 3.00 | 0.96 | Partial |
| | 5 (130) | 3 | 1 | 3.00 | 1.45 | Complete |
| EX-14 | 3 (76) | 2 | 1 | 3.00 | 0.96 | Complete |
| | 3 (76) | 3 | 1 | 3.00 | 1.45 | Complete |
| | 5 (130) | 2 | 1 | 3.00 | 0.96 | Complete |
| | 5 (130) | 3 | 1 | 3.00 | 1.45 | Complete |
| EX-15 | 10 (260) | 3 | 1 | 3.00 | 1.45 | Partial |
| | 10 (260) | 3 | 3 | 3.00 | 1.45 | Complete |
| | 10 (260) | 3 | 5 | 3.00 | 1.45 | Complete |

Example 16 (EX-16)

A 7 mil (180 micron) film of PE-8 was exposed to a CO2 laser (10.6 micron wavelength) using a Universal Laser System (Scottsdale, Arizona) run at 100% movement speed and 10-20% laser power operated in raster or vector mode. The laser was able to selectively pattern the sample by expanding the microspheres. The patterned sample was imaged using a Keyence VHX-1000 digital microscope (Itasca, Illinois). Results are shown in FIG. 4.

porated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A PTSM-coated expandable microsphere comprising a polymer shell enclosing an interior volume containing at least one blowing agent, wherein the polymer shell has an outer surface with photothermal susceptor material disposed on at least a portion thereof, wherein the photothermal susceptor material comprises metal nanowires, and wherein, if heated to at least one temperature greater than 25° C., the polymer shell expands, but does not rupture, by a sufficient amount to at least double the interior volume.

* * * * *